Patented Dec. 10, 1929

1,738,906

UNITED STATES PATENT OFFICE

LESTER KIRSCHBRAUN, OF LEONIA, NEW JERSEY

BITUMINOUS COMPOSITION AND PROCESS OF MAKING SAME

No Drawing.    Application filed July 22, 1927. Serial No. 207,821.

This invention relates to improvements in bituminous compositions and process of making same, and is directed, in particular, to the treatment of asphaltic or other bituminous material whereby to produce a composition possessing certain novel characteristics hereinafter to be more fully described, which render the resultant composition suitable for use in a large variety of capacities, such as for water resistant and soundproof walls, insulation, wallboards and other building structures.

I have discovered in accordance with the present invention that a highly novel and useful product may be produced by a treatment which imparts to an asphaltic or similar bituminous material a relatively permanent foam-like cellular structure. This treatment broadly stated, comprises the introduction of a substance, preferably one having a low surface tension, into the asphaltic or other bituminous material and then beating, agitating or whipping the material violently to aerate the same, so as to incorporate substantial quantities of air that would produce a foam-like cellular structure therein.

In carrying out the invention I may employ asphaltic or other bituminous material in the form of an aqueous dispersion, such, for instance, as that described in my issued United States Patent, No. 1,615,303, dated January 25th, 1927, and others. The dispersion may be prepared in accordance with the disclosure of the aforesaid patent, using as the base to be dispersed any bituminous or analogous material, such as asphalt, either of the natural or artificial variety, vegetable or animal pitches, resins, waxes, or the like, or suitable mixtures of these materials. In somes cases, the base to be dispersed may comprise any one or more of the aforenamed substances, fluxed, if desired, with a suitable fluxing agent, as for example, a hydrocarbon oil. As the dispersive media, I may employ colloidal mineral powders, such as clay, bentonite, fuller's earth, slate dust, metallic oxides, hydroxides and silicates and the like.

The dispersion of the desired base having been effected with the selected dispersive media, or in any other manner, the same is then in readiness for carrying forward the principles of the present invention. In accordance therewith, I may mix with the dispersion an agent, preferably one having a low surface tension, and capable of forming suds or a foam, upon the introduction of air into the composition. Thus, for example, I may add to the dispersion an alkaline earth oxide, such as calcined magnesium oxide, in quantities of say 2%, more or less, by weight, on the basis of the dispersion treated, and then subject the treated material to violent agitation or beating so as to incorporate substantial quantities of air and produce a foam structure in the mass. The sud-like cellular structure thus produced in the dispersion is relatively permanent, and when the foam dispersion is applied to a surface and the water content thereof permitted to evaporate, the foamy mass dries out without collapse or substantial alteration, the resultant film or coating being peculiarly characterized in that the aerated cellular structure is still retained therein.

This peculiar property of the mass to retain its aerated or cellular structure is all the more striking inasmuch as ordinary asphalt or other bituminous material not in dispersed form, when filled with air by agitation or other means exhibits substantially no ability to retain its aerated form, but on the contrary flows or flattens out very easily with consequent disruption of the foamy structure. On the other hand, the permanent cellular structure of the product of the present invention is probably due to the gel-like structure of the water-free film, the product being thus rendered suitable for a great number of uses to which ordinary asphalt is not adaptable. Several such uses in particular will be hereinafter more fully described.

In lieu of alkaline earth oxides, as the low surface tension agent, I may use albuminous substances, or even soap, with substantially similar results.

While the aerated or cellular structure is best and most easily produced by a rapid and violent agitating and beating action it may be also formed by incorporating air or other gas in any manner desired.

While dispersions produced with dispersive media such as those above enumerated, and treated in accordance with the principle of this invention, result in an aerated cellular structure which is relatively permanent, nevertheless, the permanence of such structure may be increased by using bentonite as the dispersive media to produce the initial dispersion. Bentonite itself seems to impart to the dispersion a gel-like structure, and when a dispersion made with bentonite is treated as above described the aerated or cellular structure so produced is highly permanent and stable, and the air pockets formed as a result of the aerating process are substantially permanently retained in the water-free film of the product. Furthermore, the product when dried out is generally found to be light and porous, and when broken up and examined shows a cellular structure which can be destroyed only by forcible squeezing or mechanical working of the material.

The product of the present invention, by virtue of its porous and cellular nature, is admirably suited for use in sound-proofing structures, or for insulation between walls which are not subject to extreme pressures.

Another field of utility is uncovered by virtue of the present invention, when the aerated dispersion above described is admixed with a hydraulic cement, such, for instance, as Portland cement. This combination may be effected with any desired proportions of the separate materials, but for purposes where a stiff product is desired, I prefer to employ a sufficient quantity of the hydraulic cement so that, when the material sets up, the resultant product will be what may be termed a bitumen-impregnated hydraulic cement foam. This foam when poured or otherwise formed into shape produces a porous product characterized by lightness of weight, resilience, rigidity, and a high degree of water resisting properties. The fabrication of the product may, if desired, take the form of slabs or sheets which may be used as a base for roofing material. The base thus formed may be covered with molten asphalt as a coating therefor, and then surfaced in any well known manner.

As an alternative to the procedure heretofore described, of combining hydraulic cement with the dispersion foam, the present invention further contemplates the production of a somewhat similar product by mixing a cementitious substance, such as plaster of Paris, with the dispersion foam. The structure produced with the use of plaster of Paris will be somewhat similar, although it may be weaker, possessing insulating, water resisting and other properties analogous to those of the product formed when using hydraulic cement as above described.

I claim as my invention:

1. The process which comprises forming an aqueous dispersion of a bitumen-pitch type base, and aerating said dispersion to produce a substantially permanent cellular and sponge-like structure, said cellular structure containing gas in the dried product.

2. The process which comprises forming an aqueous dispersion of a bitumen-pitch type base, and forming said dispersion into a foamy mass to produce a substantially permanent cellular and sponge-like structure, said cellular structure containing gas in the dried product.

3. The process which comprises forming an aqueous dispersion of a bitumen-pitch type base, and aerating said dispersion in the presence of an agent having a low surface tension to produce a substantially permanent cellular and sponge-like structure, said cellular structure containing gas in the dried product.

4. The process which comprises forming an aqueous dispersion of a bitumen-pitch type base, and agitating said dispersion in the presence of an agent having a low surface tension to produce a substantially permanent cellular and sponge-like structure, said cellular structure containing gas in the dried product.

5. The process which comprises forming an aqueous dispersion of a bitumen-pitch type base, introducing into said dispersion an agent having a low surface tension, and aerating the mass to produce a substantially permanent cellular and sponge-like structure, said cellular structure containing gas in the dried product.

6. The process which comprises forming an aqueous dispersion of a bitumen-pitch type base, introducing into said dispersion an agent having a low surface tension, and agitating the mass to produce a permanent cellular and sponge-like structure, said cellular structure containing gas in the dried product.

7. The process which comprises forming an aqueous dispersion of a bitumen-pitch type base, introducing into said dispersion an agent having a low surface tension, and forming a foamy mass of the dispersion.

8. The process which comprises forming an aqueous dispersion of a bitumen-pitch type base, forming said dispersion into a foamy mass, and incorporating cementitious material within the foamy mass.

9. A process which comprises forming an aqueous dispersion of a bitumen-pitch type base, and subjecting such dispersion to a treatment to produce a relatively permanent foam-like spongy structure therein having gas present in the dried product.

10. An aqueous waterproofing composition comprising asphalt in the form of a foamy dispersion.

11. A waterproofing composition comprising an aqueous dispersion of a bitumen-pitch type base in the form of a foam, said dispersion having bentonite incorporated therein as the dispersing agent.

12. A waterproofing composition comprising a foamy aerated aqueous dispersion of a bitumen-pitch type base, and an emulsifying agent, capable of retaining an aerated structure in the base upon elimination of the aqueous constituent of the composition.

13. A waterproof composition comprising aerated asphalt and an emulsifying agent of a character normally producing resistance to flow under heat, said composition being of cellular structure containing gas in the dried product.

14. A waterproof composition comprising asphalt having relatively permanent cellular structure and containing a bentonite-like emulsifying agent of the character normally producing resistance to flow under heat, said cellular structure containing gas in the dried product.

15. A waterproofing composition comprising asphalt having a relatively permanent cellular structure and an emulsifying agent therein of the character normally producing resistance to flow under heat and cementitious material imparting rigidity to the dried structure, said composition being of relatively permanent cellular and spongy structure and containing gas in the dried product.

In testimony whereof I affix my signature.

LESTER KIRSCHBRAUN.